(12) United States Patent
Yang et al.

(10) Patent No.: US 9,420,636 B2
(45) Date of Patent: Aug. 16, 2016

(54) MOBILE NETWORK DEVICE USING A WIRELESS SD CARD THAT USES SCSI TO SD COMMAND CONVERSION

(75) Inventors: Meiwen Yang, Shenzhen (CN); Haibo Liu, Shenzhen (CN); Keqiang Gao, Shenzhen (CN); Jinjun He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 13/096,794

(22) Filed: Apr. 28, 2011

(65) Prior Publication Data
US 2011/0271054 A1 Nov. 3, 2011

(30) Foreign Application Priority Data

Apr. 28, 2010 (CN) .......................... 2010 1 0166504

(51) Int. Cl.
| | |
|---|---|
| *G06F 12/00* | (2006.01) |
| *H04W 88/08* | (2009.01) |
| *G06F 12/02* | (2006.01) |
| *H04W 4/18* | (2009.01) |
| *H04W 8/26* | (2009.01) |

(52) U.S. Cl.
CPC ........... *H04W 88/08* (2013.01); *G06F 12/0246* (2013.01); *H04W 4/18* (2013.01); *H04W 8/26* (2013.01)

(58) Field of Classification Search
None
See application file for complete search history.

(56) References Cited

U.S. PATENT DOCUMENTS

| | | | |
|---|---|---|---|
| 7,305,535 B2 | 12/2007 | Harari et al. | |
| 7,702,821 B2 | 4/2010 | Feinberg et al. | |
| 8,046,504 B2 | 10/2011 | Feinberg et al. | |
| 2002/0065044 A1* | 5/2002 | Ito .................................. | 455/41 |
| 2002/0174337 A1* | 11/2002 | Aihara .......................... | 713/172 |
| 2005/0050256 A1* | 3/2005 | Maki et al. ........................ | 711/1 |
| 2007/0073937 A1* | 3/2007 | Feinberg et al. ................ | 710/62 |
| 2007/0136501 A1* | 6/2007 | Chang et al. ................... | 710/105 |

(Continued)

FOREIGN PATENT DOCUMENTS

| | | |
|---|---|---|
| CN | 1393776 A | 1/2003 |
| CN | 2577509 Y | 10/2003 |

(Continued)

OTHER PUBLICATIONS

Notice of Reason for Rejection received in Japanese Application No. 2011-101205, mailed Nov. 20, 2012, 7 pages.

(Continued)

*Primary Examiner* — Brian Peugh
(74) *Attorney, Agent, or Firm* — Slater Matsil, LLP

(57) ABSTRACT

A mobile network access device, system and method are disclosed. The method includes sending data or a command to a storing unit or a baseband processing unit according to a logical address in a Secure Digital (SD) command, where the SD command is a result of converting a Small Computer System Interface (SCSI) Command Descriptor Block (CDB) after a terminal device encapsulates the received data or command into the SCSI CDB. In the embodiments of the present invention, the wireless Internet access function is integrated into an SD card. The mobile network access device determines to send the data or command to the baseband processing unit or storing unit according to the logical address in the SD command, which reduces the size of the mobile network access device and enables developers to design smaller terminal products.

14 Claims, 3 Drawing Sheets

(56) References Cited

U.S. PATENT DOCUMENTS

| | | | |
|---|---|---|---|
| 2007/0174512 A1* | 7/2007 | Chao et al. | 710/52 |
| 2008/0067255 A1* | 3/2008 | Harari et al. | 235/492 |
| 2008/0235410 A1* | 9/2008 | Koh | 710/23 |
| 2009/0182919 A1 | 7/2009 | Chang et al. | |
| 2009/0300240 A1* | 12/2009 | Rofougaran | 710/65 |
| 2010/0205373 A1 | 8/2010 | He et al. | |
| 2011/0004840 A1 | 1/2011 | Feinberg et al. | |
| 2011/0271054 A1 | 11/2011 | Yang et al. | |
| 2011/0314208 A1 | 12/2011 | Feinberg et al. | |
| 2011/0320668 A1 | 12/2011 | Liu | |
| 2012/0066422 A1* | 3/2012 | Monks | 710/105 |

FOREIGN PATENT DOCUMENTS

| | | |
|---|---|---|
| CN | 1642170 A | 7/2005 |
| CN | 101383017 A | 3/2009 |
| CN | 101431828 A | 5/2009 |
| CN | 201259685 Y | 6/2009 |
| CN | 101478607 A | 7/2009 |
| CN | 201355841 Y | 12/2009 |
| CN | 101657043 A | 2/2010 |
| CN | 101686269 A | 3/2010 |
| CN | 101883446 A | 11/2010 |
| CN | 102014528 A | 4/2011 |
| CN | 102014528 B | 4/2012 |
| EP | 1 679 641 A2 | 7/2006 |
| JP | 08044831 | 2/1996 |
| JP | 10164171 A | 6/1998 |
| JP | 2002-171303 A | 6/2002 |
| JP | 2002329180 A | 11/2002 |
| JP | 2002-366919 | 12/2002 |
| JP | 2003-091707 A | 3/2003 |
| JP | 2008-158737 | 7/2008 |
| JP | 2009518759 A | 5/2009 |
| WO | WO 2007/035275 A2 | 3/2007 |
| WO | WO 2007/066285 A2 | 6/2007 |
| WO | WO 2011/134384 A1 | 11/2011 |
| WO | WO 2011/134393 A1 | 11/2011 |

OTHER PUBLICATIONS

Written Opinion of the International Searching Authority received in International Application No. PCT/CN2011/073347, Applicant Huawei Device Co., Ltd. et al., mailed Aug. 4, 2011, 6 pages.

Written Opinion of the International Searching Authority received in International Application No. PCT/CN2011/073309, Applicant Huawei Device Co., Ltd. et al., mailed Jul. 28, 2011, 6 page.

International Search Report, PCT/CN2011/073309, dated Jul. 28, 2011, 8 pages.

International Search Report, PCT/CN2011/073347, dated Aug. 4, 2011, 18 pages.

European Search Report, Application No. 11164111.4-2413, dated Aug. 16, 2011, 7 pages.

Notice of Reasons for Rejection received in Application No. 2011-101205 mailed Jun. 11, 2013, 7 pages.

* cited by examiner

MOBILE NETWORK DEVICE USING A WIRELESS SD CARD THAT USES SCSI TO SD COMMAND CONVERSION

CROSS-REFERENCE TO RELATED APPLICATION

This application claims priority to Chinese Patent Application No. 201010166504.2, filed on Apr. 28, 2010, which is hereby incorporated by reference in its entirety.

FIELD OF THE INVENTION

The present invention relates to data communication technologies, and in particular, to a mobile network access device, system and method.

BACKGROUND OF THE INVENTION

Wireless Internet terminals are prevalent due to considerable uplink and downlink rates, simplicity and convenience. In the prior art, ports of mobile network access devices include Universal Serial Bus (USB) ports, mini Peripheral Component Interconnect—Express (PCI-E) ports, and Personal Computer Memory Card International Association (PCMCIA) ports. In the process of implementing the present invention, the inventor finds that: In the prior art, the mobile network access devices are too large to settle in small ultra-thin products, and do not meet the development requirements of terminal products.

SUMMARY OF THE INVENTION

Embodiments of the present invention provide a mobile network access device, system and method to reduce the size of the mobile network access device.

A mobile network access device provided in an embodiment of the present invention includes: a Secure Digital (SD) slave controller, configured to send data or a command to a storing unit or a baseband processing unit according to a logical address in an SD command; the baseband processing unit, configured to send the data or command to an application module corresponding to the baseband processing unit if the SD slave controller determines to send the data or command to the baseband processing unit according to the logical address in the SD command; and the storing unit, configured to use a physical address corresponding to the logical address to read and write the storing unit according to the SD command if the SD slave controller determines to send the data or command to the storing unit according to the logical address in the SD command.

A terminal device includes: an adapter driver, configured to receive data or a command sent by an upper layer and encapsulate the data or command into a Small Computer System Interface (SCSI) Command Descriptor Block (CDB); an SD driver, configured to convert the CDB into an SD command, and send the SD command to an SD master controller; and the SD master controller, configured to receive the SD command, and send the SD command to a mobile network access device through an SD port.

A wireless Internet access system includes: a terminal device, configured to: receive data or a command sent by an upper layer, encapsulate the data or command into an SCSI CDB, convert the CDB into an SD command, and send the SD command to a mobile network access device; and the mobile network access device, configured to: send the data or command to a storing unit or a baseband processing unit of the mobile network access device according to a logical address in the SD command; send the data or command to an application module corresponding to the baseband processing unit if determining to send the data or command to the baseband processing unit according to the logical address in the SD command, or, obtain a physical address corresponding to the logical address and use the physical address to read and write the storing unit according to the SD command if determining to send the data or command to the storing unit according to the logical address in the SD command.

A wireless Internet access method includes: sending data or a command to a storing unit or a baseband processing unit according to a logical address in an SD command, where the SD command is a result of converting an SCSI CDB after a terminal device encapsulates the received data or command into the SCSI CDB.

In the embodiments of the present invention, the wireless Internet access function is integrated into an SD card; the mobile network access device determines to send the data or command to the baseband processing unit or storing unit according to the logical address in the SD command, which reduces the size of the mobile network access device and enables developers to design smaller terminal products.

DETAILED DESCRIPTION OF ILLUSTRATIVE EMBODIMENTS

The SD card is a storage device based on a semiconductor flash memory, and is widely applied to portable devices such as digital cameras, Personal Digital Assistants (PDAs), and multimedia players. The size of an SD card is small, and is generally 24 mm×32 mm×2.1 mm. The existing SD card serves as storage media only, and is designed to extend the storage space of a digital device. Based on the technology disclosed herein, the SD card implements the wireless broadband service.

Figure 1:
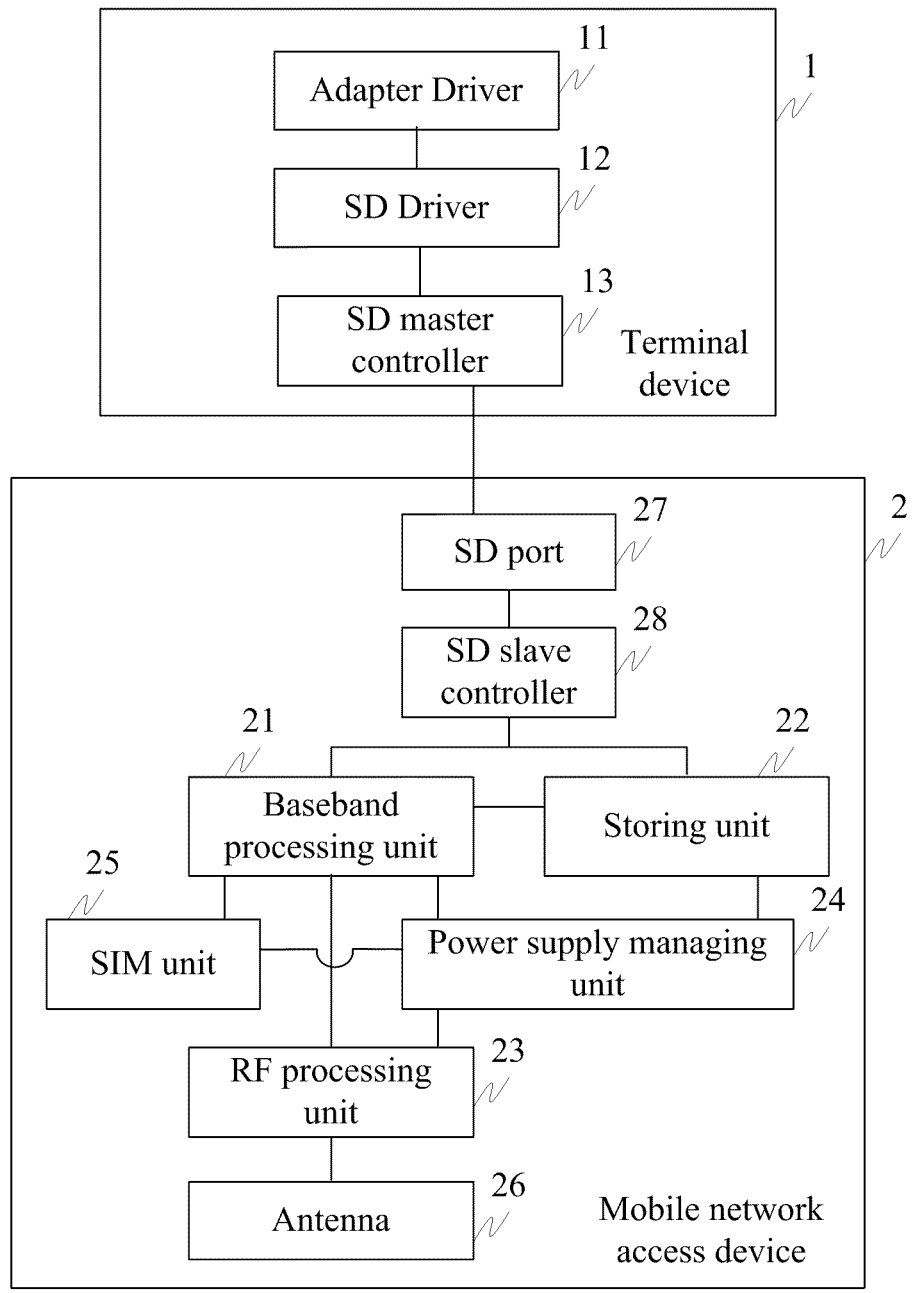
FIG. 1 shows a structure of a system according to an embodiment of the present invention.

As shown in FIG. 1, a wireless Internet access system provided in an embodiment of the present invention includes a terminal device 1 and a mobile network access device 2.

The terminal device 1 is configured to: receive data or a command sent by an upper layer, encapsulate the data or command into an SCSI CDB, convert the CDB into an SD command, and send the SD command to a mobile network access device 2.

The mobile network access device 2 is configured to: send the data or command to a storing unit 22 or a baseband processing unit 21 of the mobile network access device 2 according to a logical address in the SD command, where the storing unit 22 and the baseband processing unit 21 correspond to different logical addresses; send the data or command to an application module corresponding to the baseband processing unit 21 if determining to send the data or command to the baseband processing unit 21 according to the logical address in the SD command, or, obtain a physical address corresponding to the logical address and use the physical address to read and write the storing unit 22 according to the SD command if determining to send the data or command to the storing unit 22 according to the logical address in the SD command.

The storage area of an SD card is divided into multiple sectors. A sector is a minimum unit for erasing data. Each sector is divided into multiple blocks, and each block is generally 512 bytes in size. Each block of the storing unit 22 corresponds to a logical address and a physical address. The logical address is mapped to the physical address, and the mapping relation is stored in the SD slave controller of the mobile network access device 2. The baseband processing unit 21 corresponds to a logical address. When receiving an SD command, the SD slave controller determines to send the data or command to the storing unit 22 or baseband processing unit 21 by judging whether the logical address in the SD command corresponds to any physical address, and sends the data or command to the storing unit 22 if the logical address in the SD command corresponds to any physical address, or sends the data or command to the baseband processing unit 21 if the logical address in the SD command corresponds to no physical address.

The terminal device 1 includes an adapter driver 11, an SD driver 12, and an SD master controller 13.

The adapter driver 11 is configured to receive data or a command sent by an upper layer and encapsulate the data or command into an SCSI CDB. The adapter driver 11 is specifically configured to encapsulate the port identifier (ID) and data/command into an SCSI CDB, and set the Logical Block Address (LBA) to be accessed to a special value such as 0xFFFF FFFF. The adapter driver 11 simulates multiple virtual serial ports for the mobile network access device 2, and the upper-layer application module uses the virtual serial ports to control and access the baseband processing unit 21 on the mobile network access device 2. The port ID is the ID of a virtual serial port, and the baseband processing unit 21 uses the port ID to distinguish the type of the received data or command.

The SD driver 12 is configured to convert the CDB into an SD command, and send the SD command to the SD master controller 13.

The SD master controller 13 is configured to receive the SD command, and send the SD command to the mobile network access device 2 through an SD port.

The mobile network access device 2 includes an SD slave controller 28, a baseband processing unit 21, and a storing unit 22.

The SD slave controller 28 is configured to send the data or command to the storing unit 22 or baseband processing unit 21 according to the logical address in the SD command, where the storing unit 22 and the baseband processing unit 21 correspond to different logical addresses.

The baseband processing unit 21 is configured to send the data or command to an application module corresponding to the baseband processing unit 21 if the SD slave controller 28 determines to send the data or command to the baseband processing unit 21 according to the logical address in the SD command.

The storing unit 22 is configured to use a physical address corresponding to the logical address to read and write the storing unit 22 according to the SD command if the SD slave controller 28 determines to send the data or command to the storing unit 22 according to the logical address in the SD command.

The SD slave controller 28 is further configured to obtain a physical address corresponding to the logical address and send the physical address to the storing unit 22 if determining to send the data or command to the storing unit 22 according to the logical address in the SD command.

The storing unit 22 is further configured to store information such as running codes of the baseband processing unit 21. Specifically, the information is stored in the write-protect part in the storing unit 22.

The mobile network access device 2 may further include a Radio Frequency (RF) processing unit, a power supply managing unit 24, a Subscriber Identity Module (SIM) unit 25, an antenna 26, and an SD port 27.

The RF processing unit 23 is connected to the baseband processing unit and the antenna, and is configured to receive and transmit high-frequency signals through the antenna 26 in wireless mode, and get connected to the network.

The power supply managing unit 24 is configured to manage the power supply of the device, and supply power to the RF processing unit 23, SIM unit 25, storing unit 22, and baseband processing unit 21.

The SIM unit 25 is configured to store user information. The SIM unit 25 further stores user information authorization and Value-Added Service (VAS) information of an operator. In this embodiment, the signal cable of the SD port of the SD card has only 9 pins. Therefore, an ordinary external SIM is not applicable, but a SIM chip is applicable. The function of an ordinary SIM is packed into the SIM chip through SIM wafer.

The SD port 27 is configured to provide a connection between the mobile network access device 2 and the terminal device 1. Specifically, the SD port 27 is configured to provide a connection between the SD slave controller 28 of the mobile network access device 2 and the SD master controller 13 of the terminal device 1.

Figure 2:
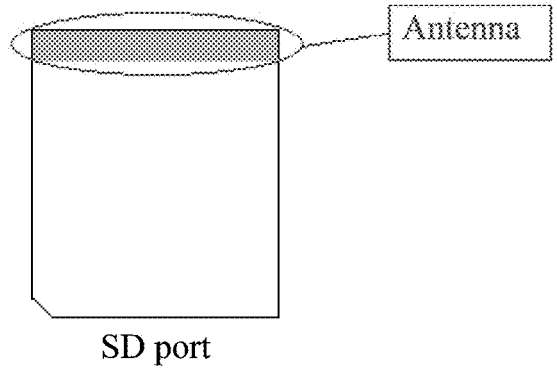
FIG. 2 shows a location of an antenna according to an embodiment of the present invention.

To reduce the size of the mobile network access device, the antenna 26 may be set in a Printed Circuit Board (PCB). As shown in FIG. 2, the antenna may be laid outside the SD card, for example, opposite to the SD port 27 of the SD card. Meanwhile, an area may be reserved outside the SD card, and no component is allowed to be set in this area near the antenna 26.

Figure 3:
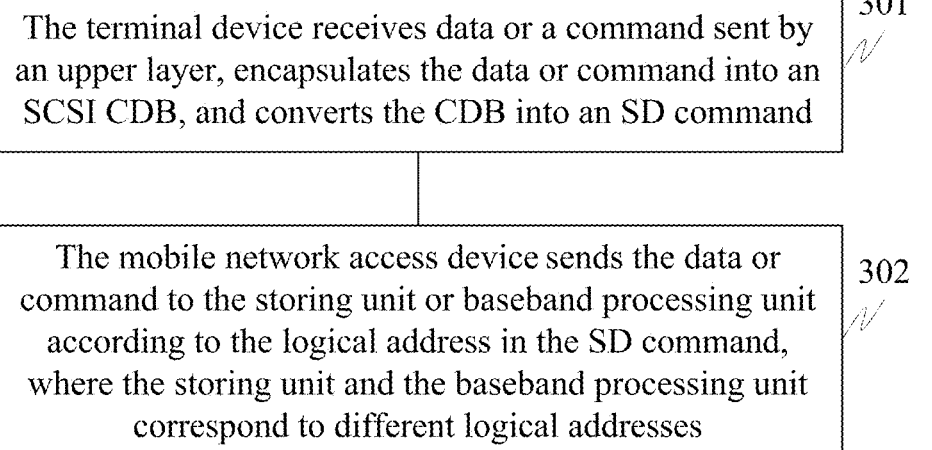
FIG. 3 is a flowchart of a first method according to an embodiment of the present invention.

FIG. 3 shows a wireless Internet access method provided in an embodiment of the present invention. The method includes the following steps:

Step 301: The terminal device receives data or a command sent by an upper layer, encapsulates the data or command into an SCSI CDB, and converts the CDB into an SD command.

Step 302: The mobile network access device sends the data or command to the storing unit or baseband processing unit according to the logical address in the SD command, where the storing unit and the baseband processing unit correspond to different logical addresses.

Figure 4:
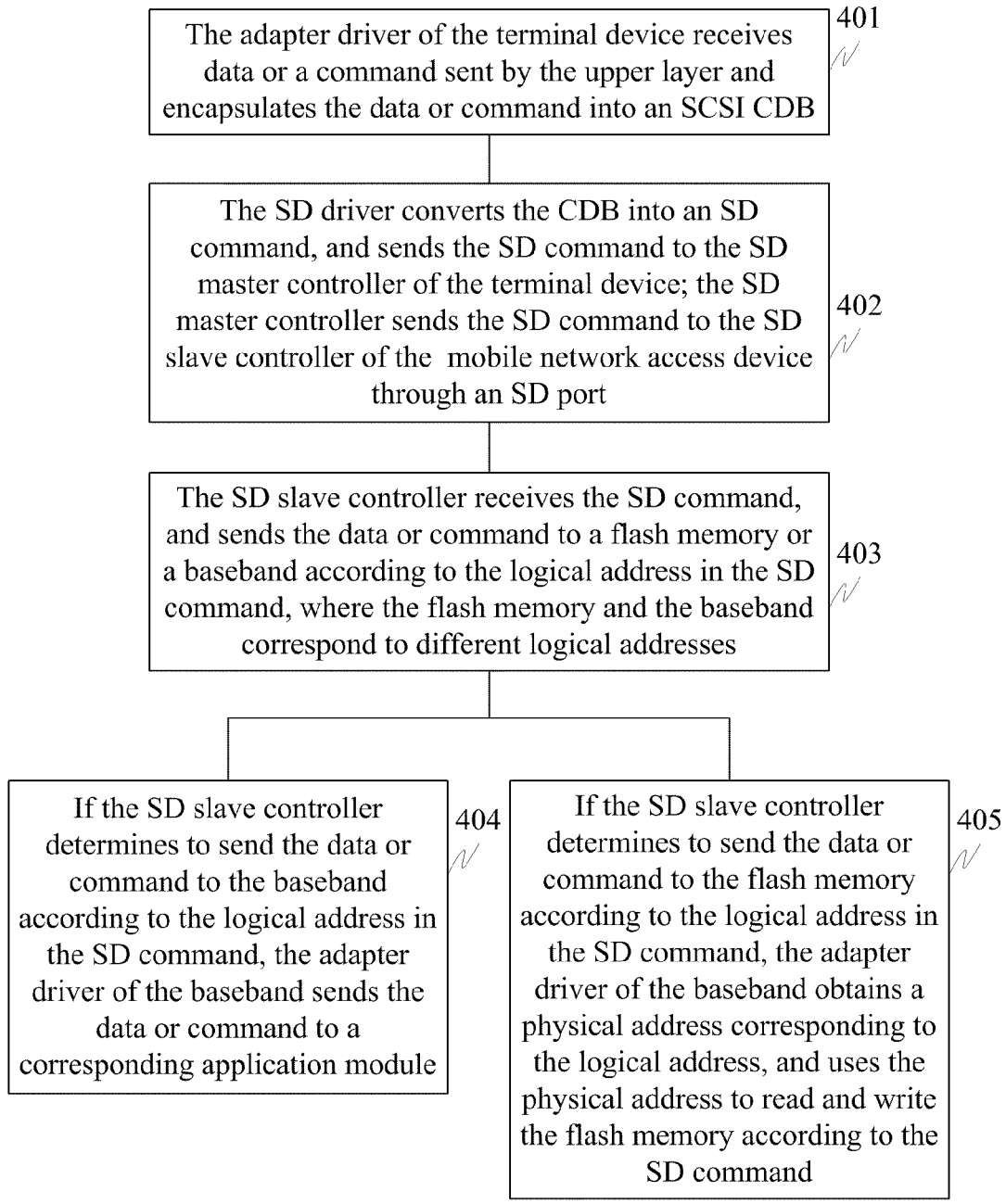
FIG. 4 is a flowchart of a second method according to an embodiment of the present invention.

The following uses a specific application scenario to describe the method embodiment of the present invention. As shown in FIG. 4, the method includes the following steps:

Step 401: The adapter driver of the terminal device receives data or a command sent by an upper layer and encapsulates the data or command into an SCSI CDB. The terminal device may be a Personal Computer (PC), a digital camera, and so on.

Specifically, the adapter driver of the terminal device encapsulates the port ID and data/command into an SCSI CDB, and sets the LBA to be accessed to a special value such as 0xFFFF FFFF. The adapter driver 11 simulates multiple virtual serial ports for the mobile network access device 2, and the upper-layer application module uses the virtual serial ports to control and access the baseband processing unit 21 on the mobile network access device 2. The port ID is the ID of a virtual serial port, and the baseband processing unit 21 uses the port ID to distinguish the type of the received data or command.

Step 402: The SD driver converts the CDB into an SD command, and sends the SD command to the SD master controller of the terminal device. The SD master controller sends the SD command to the SD slave controller of the mobile network access device through an SD port.

Step 403: The SD slave controller receives the SD command, and sends the data or command to a flash memory or a baseband according to the logical address in the SD command, where the flash memory and the baseband correspond to different logical addresses.

The storage area of an SD card is divided into multiple sectors. A sector is a minimum unit for erasing data. Each sector is divided into multiple blocks, and each block is generally 512 bytes in size. Each block of the flash memory corresponds to a logical address and a physical address. The logical address is mapped to the physical address, and the mapping relation is stored in the SD slave controller. The baseband corresponds to a logical address. When receiving the SD command, the SD slave controller determines to send the data or command to the flash memory or baseband by judging whether the logical address in the SD command corresponds to any physical address, and sends the data or command to the flash memory if the logical address in the SD command corresponds to any physical address, or sends the data or command to the baseband if the logical address in the SD command corresponds to no physical address.

Step 404: If the SD slave controller determines to send the data or command to the baseband according to the logical address in the SD command, the adapter driver of the baseband sends the data or command to a corresponding application module.

Step 405: If the SD slave controller determines to send the data or command to the flash memory according to the logical address in the SD command, the adapter driver of the baseband obtains a physical address corresponding to the logical address, and uses the physical address to read and write the flash memory according to the SD command.

In this embodiment, the wireless Internet access function is integrated into an SD card; the mobile network access device determines to send the data or command to the baseband processing unit or storing unit according to the logical address in the SD command, which reduces the size of the mobile network access device and enables developers to design smaller terminal products. All terminal devices with an SD card port such as a digital camera, a PDA, and a multimedia player can use the mobile network access device provided herein.

After reading the foregoing embodiments, those skilled in the art are clearly aware that the embodiments of the present invention may be implemented through hardware, or, preferably in most circumstances, through software in addition to a necessary universal hardware platform. Therefore, the technical solution under the present invention or its novelty over the prior art may be embodied in a software product. The software product is stored in a computer-readable storage medium such as a floppy disk, a hard disk, and a Compact Disk-Read Only Memory (CD-ROM), and incorporates several instructions for instructing a device to execute the method specified in any embodiment of the present invention.

The above descriptions are merely preferred embodiments of the present invention, but not intended to limit the scope of the present invention. Any modifications, variations or replacements that can be easily derived by those skilled in the art shall fall within the scope of the present invention. Therefore, the scope of the present invention is subject to the appended claims.

What is claimed is:

1. A mobile network access device, comprising:
a secure digital (SD) slave controller;
a baseband processing unit; and
a storing unit;
wherein the SD slave controller is configured to send data or a command to the storing unit or the baseband processing unit according to a logical address in an SD command,
wherein the SD slave controller is further configured to send the data or command to the storing unit if the logical address in the SD command corresponds to any physical address and send the data or command to the baseband processing unit if the logical address in the SD command corresponds to no physical address;
wherein the baseband processing unit is configured to send the data or command to an application module corresponding to the baseband processing unit if the SD slave controller sends the data or command to the baseband processing unit according to the logical address in the SD command; and
the storing unit, configured to use a physical address corresponding to the logical address to read from and write to the storing unit according to the SD command if the SD slave controller determines to send the data or command to the storing unit according to the logical address in the SD command.

2. The device according to claim 1, wherein:
the SD command is a result of converting a Small Computer System Interface (SCSI) Command Descriptor Block (CDB) after a terminal device encapsulates the data or command into the SCSI CDB.

3. The device according to claim 1, wherein:
the storing unit comprises an independent write-protect part, which is configured to store running codes of the baseband processing unit.

4. The device according to claim 1, further comprising:
an SD port, configured to provide a connection between the SD slave controller of the mobile network access device and an SD master controller of a terminal device.

5. The device according to claim 4, wherein:
the device further comprises a Radio Frequency (RF) processing unit, a power supply managing unit, a Subscriber Identity Module (SIM) unit, and an antenna;
the RF processing unit is connected to the baseband processing unit and the antenna and is configured to receive and transmit high-frequency signals through the antenna in wireless mode, and to get connected to a network;
the power supply managing unit is configured to manage power supply of the device and to supply power to the RF processing unit, SIM unit, storing unit, and baseband processing unit; and
the SIM unit is configured to store user information.

6. The device according to claim 5, wherein the SIM unit comprises a SIM chip.

7. The device according to claim 5, wherein the antenna is located opposite to an SD port of an SD card.

8. The device according to claim 1, wherein the SD slave controller is further configured to obtain a physical address corresponding to the logical address and to send the physical address to the storing unit if sending the data or command to the storing unit according to the logical address in the SD command.

9. A wireless Internet access system, comprising:
a terminal device; and
a mobile network access device;
wherein the terminal device is configured to receive data or a command sent by an upper layer, to encapsulate the data or command into a Small Computer System Interface (SCSI) Command Descriptor Block (CDB), to convert the CDB into a Secure Digital (SD) command, and to send the SD command to a mobile network access device; and
wherein the mobile network access device is configured to send the data or command from the terminal device to a storing unit or a baseband processing unit of the mobile network access device according to a logical address in the SD command, to send the data or command to an application module corresponding to the baseband processing unit if determining to send the data or command to the baseband processing unit according to the logical address in the SD command, or to obtain a physical address corresponding to the logical address and use the physical address to read from and write to the storing unit according to the SD command if determining to send the data or command to the storing unit according to the logical address in the SD command,
wherein the determining to send the data or command to the baseband processing unit according to the logical address in the SD command comprises determining to send the data or command to the baseband processing unit if the logical address in the SD command corresponds to no physical address, and the determining to send the data or command to the storing unit according to the logical address in the SD command comprises determining to send the data or command to the storing unit if the logical address in the SD command corresponds to any physical address.

10. A wireless Internet access method, comprising:
sending data or a command to a storing unit or a baseband processing unit according to a logical address in a Secure Digital (SD) command, wherein the SD command is a result of converting a Small Computer System Interface (SCSI) Command Descriptor Block (CDB) after a terminal device encapsulates the data or command into the SCSI CDB;
wherein sending the data or command to the baseband processing unit comprises sending the data or command to an application module corresponding to the baseband processing unit if the SD slave controller determines to send the data or command to the baseband processing unit according to the logical address in the SD command; and
wherein sending the data or command to the storing unit comprises using a physical address corresponding to the logical address to read from and write to the storing unit according to the SD command if the SD slave controller determines to send the data or command to the storing unit according to the logical address in the SD command,
wherein the SD slave controller determines to send the data or command to the baseband processing unit according to the logical address in the SD command comprises the SD slave controller determines to send the data or command to the baseband processing unit if the logical address in the SD command corresponds to no physical address, and the SD slave controller determines to send the data or command to the storing unit according to the logical address in the SD command comprises the SD slave controller determines to send the data or command to the baseband processing unit if the logical address in the SD command corresponds to any physical address.

11. The method according to claim 10, further comprising:
receiving the data or command sent by an upper layer;
encapsulating the data or command into the SCSI CDB; and
converting the CDB into the SD command.

12. The method according to claim 11, wherein:
receiving the data or command sent by an upper layer, encapsulating the data or command into the SCSI CDB and converting the CDB into the SD command comprises:
receiving, by an adapter driver of the terminal device, the data or command sent by the upper layer and encapsulating the data or command into the SCSI CDB; and
converting, by an SD driver, the CDB into the SD command, and sending the SD command to an SD master controller of the terminal device.

13. The method according to claim 12, wherein sending the data or command to the storing unit or baseband processing unit according to the logical address in the SD command comprises receiving the SD command at an SD slave controller of the mobile network access device and sending the data or command to the storing unit or baseband processing unit according to the logical address in the SD command.

14. The method according to claim 11, wherein receiving the data or command sent by the upper layer and encapsulating the data or command into the SCSI CDB comprises:
by the adapter driver of the terminal device, encapsulating a port identifier (ID) and the data/command into the SCSI CDB and setting a Logical Block Address (LBA) to be accessed to a special value.

* * * * *